United States Patent [19]
Tuutijärvi et al.

[11] Patent Number: 5,809,399
[45] Date of Patent: Sep. 15, 1998

[54] METHOD AND CIRCUIT FOR FILTERING DISTURBANCES IN A RADIO RECEIVER

[75] Inventors: Mika Tuutijärvi; Raimo Klemetti; Jorma Savolainen; Eero Mäkikallio, all of Oulu, Finland

[73] Assignee: Nokia Mobile Phones Limited, Finland

[21] Appl. No.: 583,399

[22] Filed: Jan. 5, 1996

[30] Foreign Application Priority Data

Jan. 10, 1995 [FI] Finland ................................. 950106

[51] Int. Cl.$^6$ ...................................................... H04B 1/12
[52] U.S. Cl. ............................ 455/63; 455/266; 455/296
[58] Field of Search .................................. 455/254, 266, 455/296, 306, 307, 63, 67.1, 67.3, 226.1, 226.2, 226.3; 375/350

[56] References Cited

U.S. PATENT DOCUMENTS

| | | | |
|---|---|---|---|
| 5,287,556 | 2/1994 | Cahill | 455/307 |
| 5,303,406 | 4/1994 | Hansen et al. . | |
| 5,303,413 | 4/1994 | Braegas | 455/307 |
| 5,307,515 | 4/1994 | Kuo et al. | 455/307 |
| 5,345,448 | 9/1994 | Keskitalo . | |
| 5,410,733 | 4/1995 | Niva et al. . | |
| 5,465,410 | 11/1995 | Hiben et al. | 455/307 |
| 5,630,218 | 5/1997 | Muto | 455/307 |

FOREIGN PATENT DOCUMENTS

| | | |
|---|---|---|
| 0 184 618 A1 | 6/1986 | European Pat. Off. . |
| 459383 | 12/1991 | European Pat. Off. ............... 455/307 |
| 4208605 | 9/1993 | Germany . |
| 4222309 | 1/1994 | Germany . |
| 2 270 223 | 3/1994 | United Kingdom . |
| WO 91/02418 | 2/1991 | WIPO . |
| WO 91/12675 | 8/1991 | WIPO . |
| WO 92/06540 | 4/1992 | WIPO . |
| WO 93/16567 | 8/1993 | WIPO . |

*Primary Examiner*—Nguyen Vo
*Assistant Examiner*—Lester G. Kincaid
*Attorney, Agent, or Firm*—Perman & Green, LLP

[57] ABSTRACT

The strength of the signal or carrier in one or more transfer channels near the receiving channel of a radio device operating in a radio telephone system is measured, for example, with a MAHO measurement. The measurement result is used to calculate the disturbance caused by the transfer channel to the receiving channel, and, based on the acquired result, the frequency response of a filter included by the receiver is adjusted, for example, by changing the width or slope of the passband.

14 Claims, 7 Drawing Sheets

METHOD AND CIRCUIT FOR FILTERING DISTURBANCES IN A RADIO RECEIVER

BACKGROUND OF THE INVENTION

The invention relates to a method and circuit for filtering disturbances in a radio receiver used in a radio telephone system, in which system the transfer of information between a radio device and a base station takes place via a transfer channel assigned by a base station belonging to the radio telephone system, and in which system a measurement made in the receiver of the radio device may be used to determine the signal levels in the transfer channels assigned by the base station.

The transfer channels used in a radio telephone system are usually arranged so that the medium frequencies of adjacent transfer channels are at a standard distance from each other. The number of transfer channels depends on the total width of the frequency range reserved for the radio telephone system and the bandwidth of the transfer channels. A radio telephone system is designed to have as many transfer channels as possible. For this reason, when using radio devices of the prior art, it is possible that information being transferred on transfer channels close to each other may disturb each other. The disturbances may even cause calls to be disconnected.

Disturbances can be eliminated by limiting the number of transfer channels used by one base station, so that base stations located near to each other do not use the same or adjacent transfer channels. The disadvantage of this arrangement is that base stations can only use a portion of the whole system's information transferring capacity.

Disturbances can also be eliminated by using a steeply sloped filter in the receiver of the radio device, that is, a filter whose attenuation increases sharply outside its passband frequency range. A steeply sloped filter causes signal distortion because, for instance, its phase response is not uniform throughout the passband range. Due to the changing phase response, a delay is formed between signal components with different frequencies, causing inter-symbol interference (ISI) between the characters being transferred along the transfer channel. A steeply sloped filter would not be needed in disturbance-free conditions, making the error caused by the steeply sloped filter unnecessarily large. A filter with an essentially uniform passband that matches the passband of the steeply sloped filter could be located at the output of the steeply sloped filter, correcting the phase response. Implementation of a filter that corrects phase response in a digital signal processing unit would require extensive calculating capacity and is difficult to realize. Furthermore, phase response may vary from filter to filter and changes with variations in temperature.

The dotted line plotted in the amplitude/frequency coordinates in FIG. 1 depicts the simplified frequency response of a filter whose passband width corresponds to the bandwidth of a transfer channel. This filter is later referred to as a wide passband filter. The solid line in the same figure depicts the frequency response of a filter whose passband width is narrower than the bandwidth of the transfer channel. This filter is later referred to as a narrow passband filter. Additionally, the gray areas in FIG. 1 simply depict the distribution of three adjacent transfer channels ch(n−1), ch(n), ch(n+1). From FIG. 1 it can be seen how great an influence the frequency response of the filter has on how strongly a signal in an adjacent channel effects the signal in the receiver channel. The frequency bands of the wide passband filter and the signal in the adjacent transfer channel clearly overlap, increasing the probability of disturbances appearing in the receiver channel. When a narrow passband filter is used, the effect of the signal in the adjacent transfer channel on the signal being received is very small, decreasing the disturbance level of the signal being received and noticeably improving the bit error ratio (BER).

The transfer channel used for transferring information between a base station and a radio device may be switched frequently during the transfer, depending, for instance, on the quality of the transfer channel. The definition of the quality of the transfer channel is usually based on a measurement made by the radio device, the result of which is sent to the base station for analysis. The radio device most suitably makes the measurement under control of the base station. The object of the measurement may be the receiving channel being used in the information transfer or some other transfer channel of the radio telephone system, such as a transfer channel being used by another base station. The base station determines the quality of the receiving channel based on the result of the analysis of the measurement. The measurement can measure the strength of the signal or the strength of the carrier frequency. To determine the quality, the base station uses the measurement result to calculate the signal/noise ratio of the channel, for example, which can then be compared to a predefined reference value. If the signal/noise ratio is lower than the reference value, the base station will attempt to switch the call to a transfer channel with a higher signal/noise ratio.

The base station can also use the measurement result to determine the quality of the receiving channel by calculating or having the radio telephone calculate the bit error ratio (BER) of the transfer channel, and then decide whether it is necessary to switch channels. Other nearby base stations can also determine the quality of the connection.

In a time-division multiple access (TDMA) based system the time when the above measurements are performed, is called a measuring time period. Several measuring time periods may exist during one frame. During these measuring time periods the base station can order the mobile phone measure the RSSI (Received Signal Strength Indicator) of several different channels. The results of the measurements are used in making the decision to switch channels. The RSSI measurement can be made during the idle period (IDLE) after the RX time period, before the beginning of the TX time period. The result of the measurement is not necessarily reliable, because a strong signal near the channel being measured may distort the measurement results, in which case the base station will make an incorrect decision concerning the quality of the receiver channel.

FIG. 2 shows a simple structure of a frame of a radio telephone system based on time-divided channeling. The frame is made up of at least one reception time period RX and at least one transmission time period TX. The frame can also contain one or more measurement time periods Ml. The frames are repeated regularly during the connection. During the receiver time period RX the radio telephone receives a signal from a base station. Correspondingly, during the transmitter time period TX the radio telephone sends a signal to the base station. The radio telephone can use the measurement time period Ml to measure the signal strength of different channels, for example. The measurement is controlled by the base station. For example, the MAHO (Mobile Assisted Hand Off) measurement specified in the USDMR system functions in this manner. The measurement is applied in the North American DAMPS network.

SUMMARY OF THE INVENTION

The object of the present invention is to eliminate the faults presented above that are related to the disturbances caused by channels adjacent to the receiver channel when using a gradually sloped filter and to the phase distortion caused by a steeply sloped filter. An additional object of the present invention is to create a radio telephone system in which the information transferring capacity of the system is exploited as efficiently as possible. Yet another object of the present invention is to improve the reliability of the measurements used to determine the quality of the transfer channels in the prior art. For achieving these objects, the invention provides for the adjustment of the frequency response of a filter in a received channel by use of a measurement of a signal level of an information transfer channel near the receive channel.

The present invention is based on the concept of setting the receiver to the transfer channel being measured, most suitably the transfer channel adjacent to the receiver channel, during a suitable time period and measuring the strength of the signal or carrier of the transfer channel being measured. A digital signal processing unit in the receiver then uses the measurement to calculate the disturbance caused by the measured transfer channel to the receiver channel and, based on the calculation, adjusts the frequency response of one of the receiver filters by changing the width or slope of the passband, for example.

The adjustment is most advantageously done in a digital base frequency filter that is part of a digital signal processing unit, whereupon the adjustment is made by modifying the factors of the filtration equation of the digital filter.

In one advantageous embodiment the measurement is made with existing instruments that are used in the MAHO measurement, for example. In such a case it is most advantageous to make the measurement just before measurement time period M1 or immediately thereafter.

BRIEF DESCRIPTION OF THE DRAWINGS

The present invention is described in detail below using application examples, with references to the enclosed drawings.

DETAILED DESCRIPTION

Figure 1:
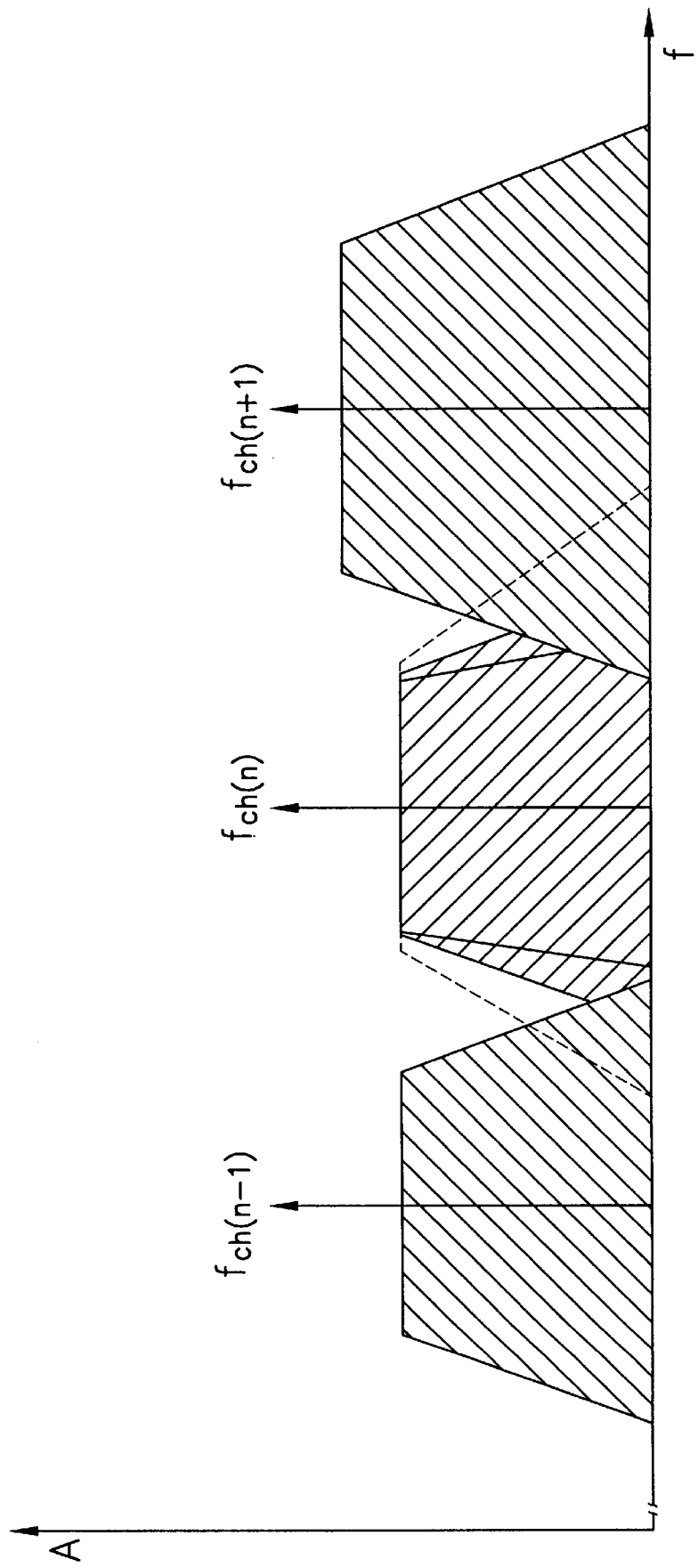
FIG. 1 shows on amplitude/frequency coordinates the effect of a wide and a narrow bandwidth filter of the prior art on the attenuation of a disturbance caused by a signal in an adjacent channel.
Figure 2:
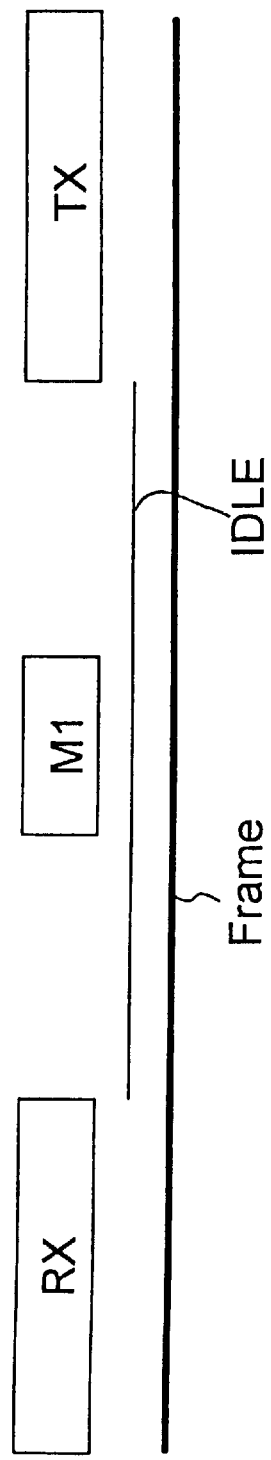
FIG. 2 shows a timing chart of a frame of the prior art based on a time-division multiple access method.
Figure 3:
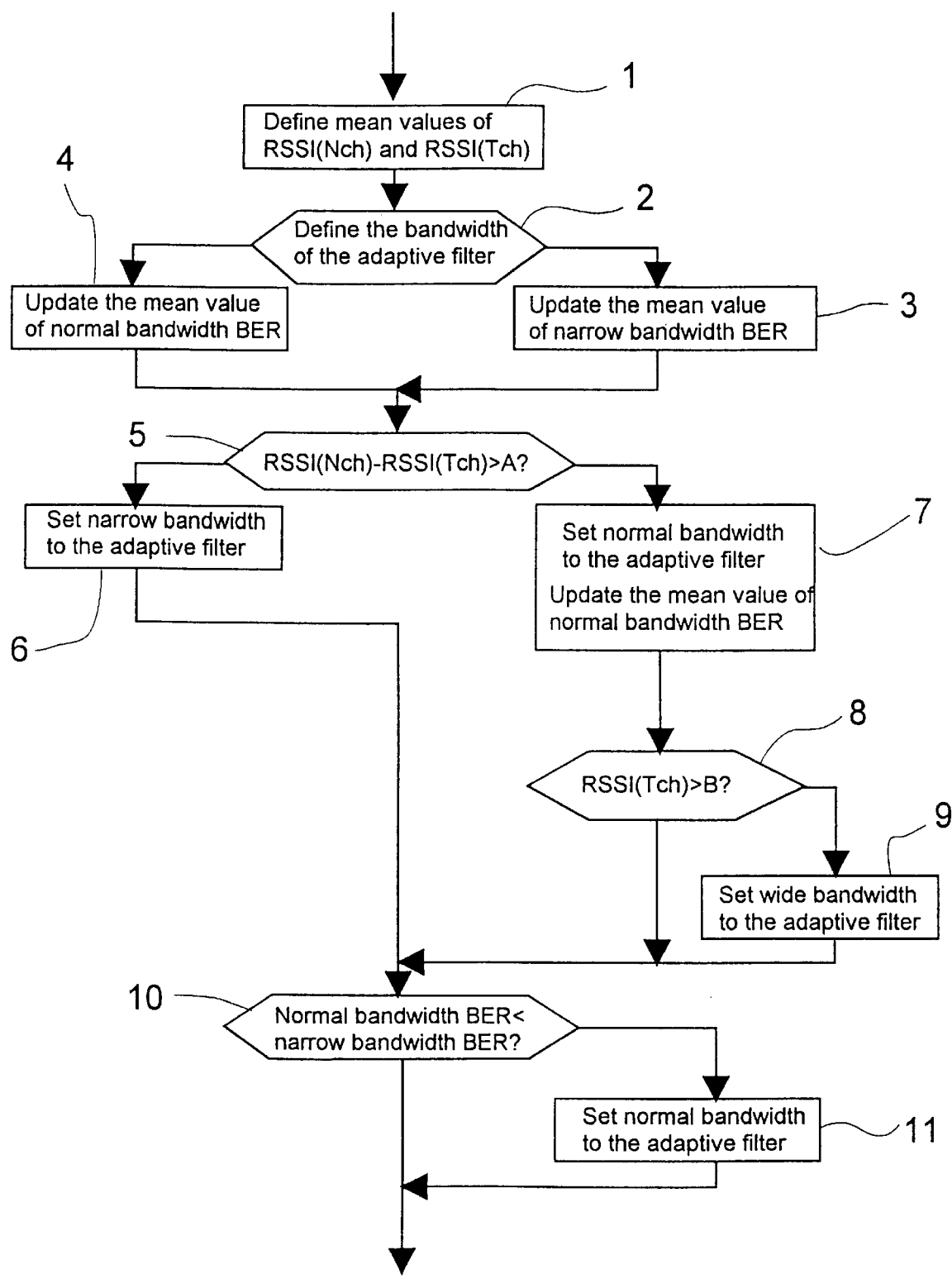
FIG. 3 shows a flow chart of the operating principle of an preferred embodiment of the method described in the present invention.

FIG. 3 employs a simplified flow chart to depict the operation of an advantageous embodiment of the method described in the present invention when the strength of the signal is measured. The embodiment implements step-like adjustment of the filter's bandwidth, so that three different bandwidth set values are available:

the first set value W1, corresponding to a filter with the narrowest bandwidth of the bandwidths used in this embodiment, the second set value W2, corresponding to the normal bandwidth of this embodiment and the third set value W3, corresponding to a filter with the widest bandwidth of the bandwidths used in this embodiment.

The bandwidth of the filter is set to the second set value W2 when operation begins.

Additionally, the average value of two different bit error ratios is calculated in this embodiment:

the first average value of the bit error ratio BER1 refers to the average value of the bit error ratio of the receiver when the bandwidth of the filter is set to the first set value W1 and the second average value of the bit error ratio BER2 refers to the average value of the bit error ratio of the receiver when the bandwidth of the filter is set to the second set value W2.

First, in block 1, the average strength of the receiving channel signal RSSI(Tch) and the average strength of a nearby, most suitably adjacent, transfer channel signal RSSI(Nch) are calculated. Previously calculated average values, which have been stored in memory, and the newest measurement results are taken into account in the calculation. In practical applications the strength of the signal in the adjacent transfer channel can be measured noticeably less frequently than the strength of the signal in the receiver channel. In block 2 the adjustable filter's bandwidth set value is analyzed. If the bandwidth of the adjustable filter is set to the first set value W1, the first average value of the bit error ratio BER1 is calculated, as in block 3. If the bandwidth of the filter is set to a set value other than the first set value W1, the second average value of the bit error ratio BER2 is calculated in block 4.

Next, the average strength of the adjacent transfer channel signal RSSI(Nch) is compared to the average strength of the receiver channel signal RSSI(Tch) (block 5). If the difference between the average strength of the adjacent transfer channel RSSI(Nch) and the average strength of the receiver channel RSSI(Tch) is greater than preset threshold value A, the bandwidth of the filter is set to the first set value W1 (block 6). Threshold value A depends on the structure of the filter and is determined by experimentation. Threshold value A may be fixed or it may be modifiable during operation, based on a calculated bit error ratio BER1, BER2, for example If the difference between the average strength of the adjacent transfer channel RSSI(Nch) and the average strength of the receiving channel RSSI(Tch) is less than or equal to threshold value A, the bandwidth of the filter is set to the second set value W2 in block 7 and the second average bit error ratio BER2 is calculated. After this, the average strength of the receiving channel RSSI(Tch) is analyzed to determine if it is greater than second threshold value B (block 8). If the average strength of the receiving channel RSSJ(Tch) is greater than second threshold value B, the bandwidth of the filter is set to the third set value W3 in block 9. If the average strength of the receiving channel RSSI(Tch) is less than or equal to threshold value B, the bandwidth is not changed.

Finally, in block 10, the average value of the first and second bit error ratio BER1, BER2 is compared. If the average value of the second bit error ratio BER2 seems to be less than the average value of the first bit error ratio BER1, the bandwidth of the filter is set to the second set value W2 (block 11).

It is advantageous to calculate the first average value BER1 and the second average value BER2 of the bit error ratio as described above, but they can also be calculated at some other time. It is essential that they are calculated before the comparison is made in block 10.

The method described in the present invention can also be applied according to the flow chart in FIG. 3 by measuring the strength of the carrier instead of the strength of the signal.

The method described in the present invention can also be applied by using only two bandwidth set values, whereupon the procedure is according to blocks 1–6 of the flow chart in FIG. 3.

It must also be noted that the procedure according to the method described in the present invention is not limited to one performance, but in practical applications the procedure is repeated at suitable intervals, such as after each measurement associated with the method.

Figure 4:
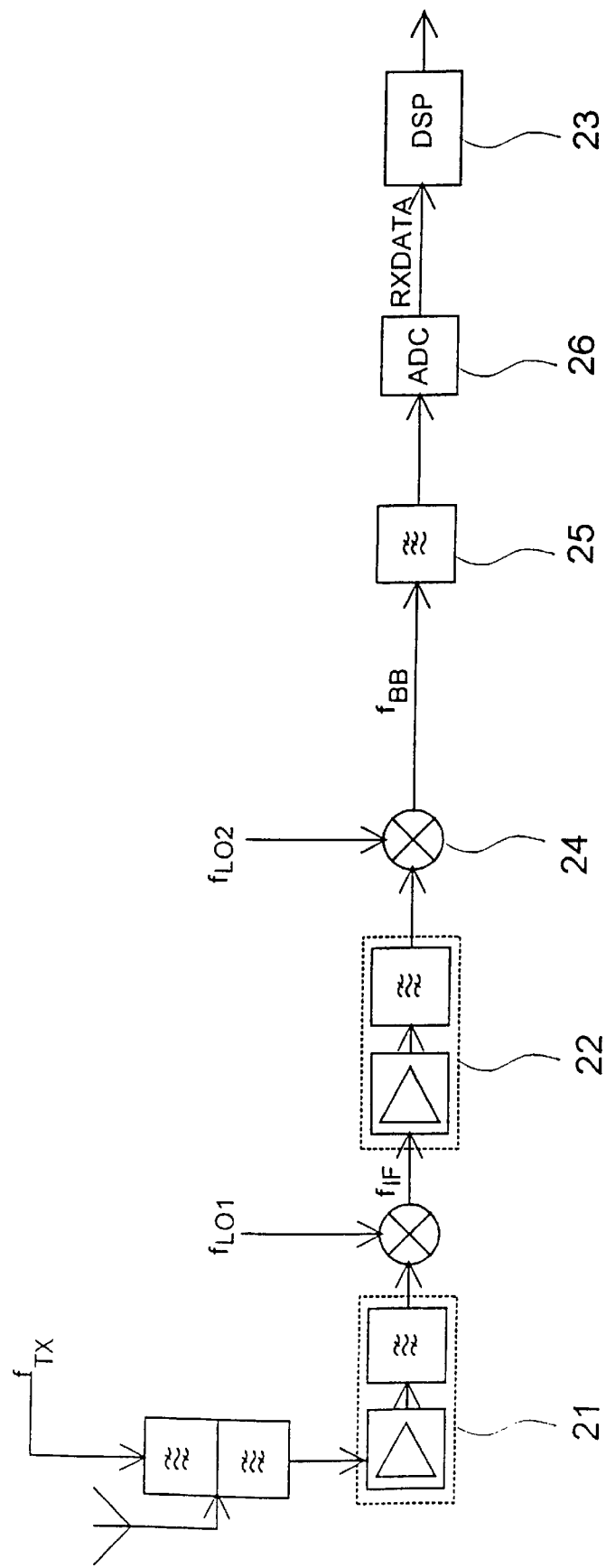
FIG. 4 shows a block diagram of an embodiment of the method according to the invention in a digital base frequency filter.
Figure 5:
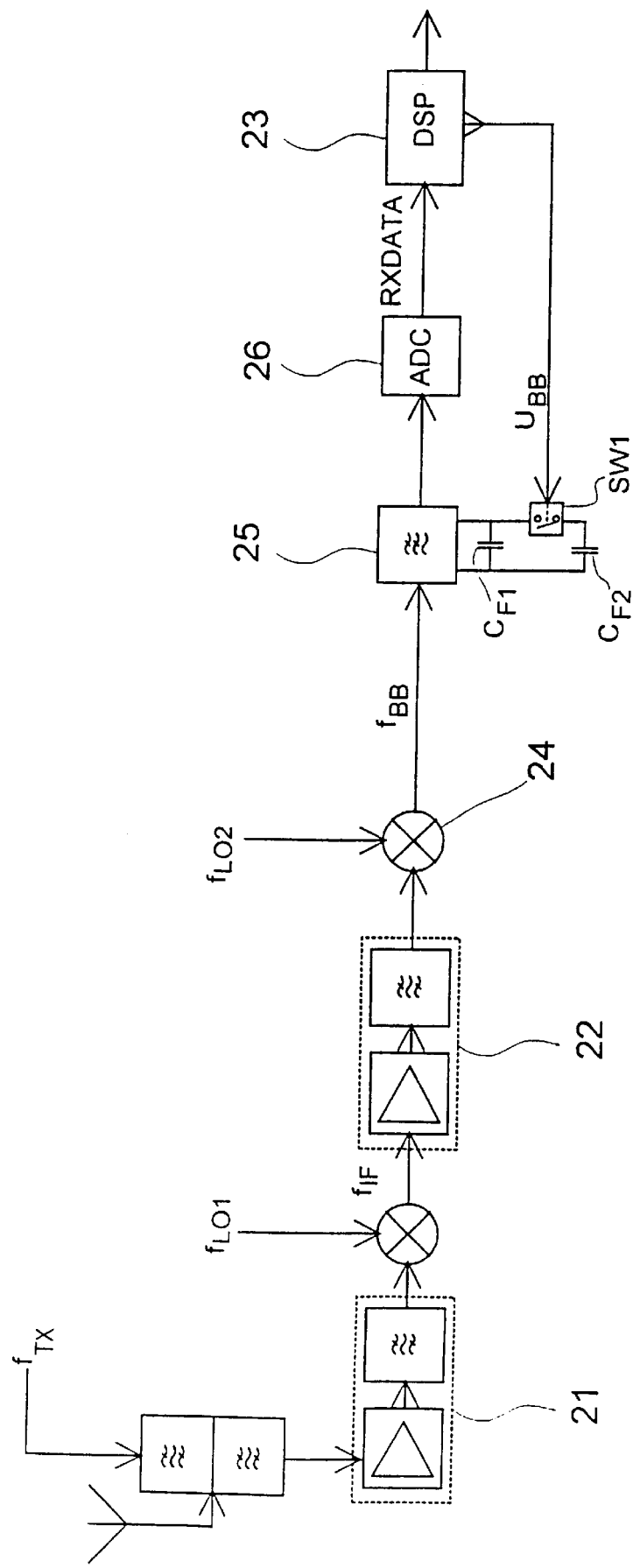
FIG. 5 shows a block diagram of an embodiment of the method according to the invention in an analog base frequency filter.

The block diagram in FIG. 4 shows a receiver of the prior art, in which the present invention can be applied. The receiver can be an ordinary receiver, it can include one or more intermediate frequency stages, or it can be a direct conversion receiver. The passband width of high frequency stage 21 and intermediate frequency stage 22 of the receiver is fixed. The adjustment described in the present invention is created in the digital base frequency filter of digital signal processing unit 23 (DSP). During the measurement, digital signal processing unit 23 sets the receiver to the frequency of the transfer channel being measured by modifying the frequency $f_{LO1}$ of the first local oscillator. Base frequency signal $f_{BB}$, formed from the measured signal, is output by second mixer 24, and is input via analog base frequency filter 25 to AD converter 26 (ADC). The passband width of analog base frequency filter 25 is also fixed. The base frequency signal is sampled and converted into digital form in AD converter 26, whereupon the converted signal RXDATA can be input to digital signal processing unit 23 for analysis and processing. Digital signal processing unit 23 calculates the strength of the measured transfer channel signal RSSI(Tch), RSSI(Nch) based on samples taken from the converted signal RXDATA and compares the result of the calculation to at least one previously stored reference value A, B. As a result of the comparison, digital signal processing unit 23 creates new filtration factors for the digital base frequency filter for the duration of the present or next receiver time periods RX. Digital signal processing unit 23 is most advantageously implemented with a digital signal processor, but ASIC components and conventional microcontrollers can also be used. A program code that controls the functioning of the radio device is preprogrammed into digital signal processing unit 23. The program code also contains functions needed to implement the method described in the present invention. FIG. 5 shows a different embodiment of the application shown in FIG. 4. Operation is the same for the main part as in the application shown in FIG. 4. The main difference is that the object of the adjustment is analog base frequency filter 25, which is composed of analog components. To adjust the frequency response of analog base frequency filter 25, digital signal processing unit 23 modifies control voltage $U_{BB}$. When control voltage $U_{BB}$ is low, analog switch SW1 is open, and only filter capacitor $C_{F1}$ is in the filter circuit. Correspondingly, as the control voltage rises above the switching voltage of analog switch SW1, analog switch SW1 connects second filter capacitor $C_{F2}$ to the filter circuit. There may be several switchable capacitors. The adjustment can also be implemented by using switched capacitor components (SC), which are controlled by an external clock signal. In such a case it is advantageous to perform the adjustment by varying the frequency of the clock signal.

Figure 6:
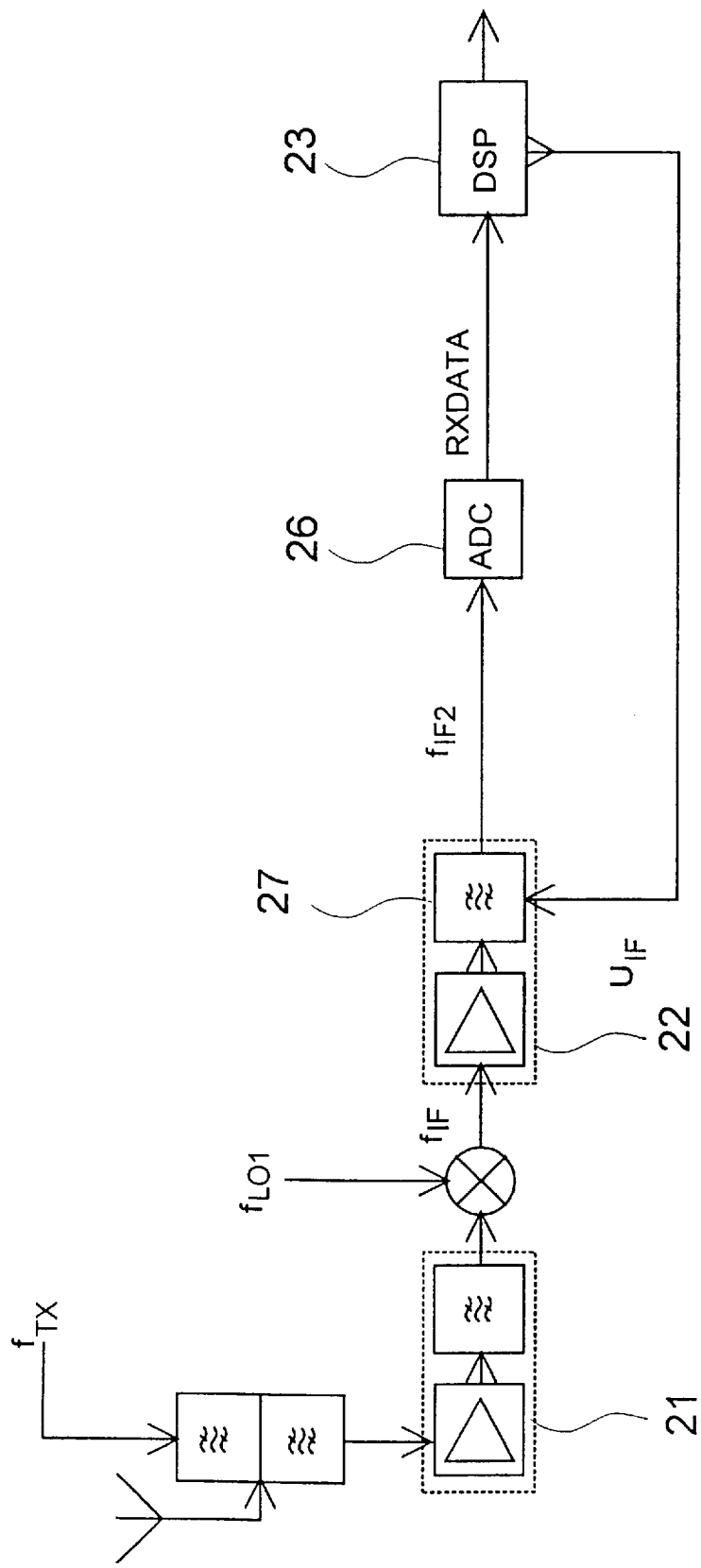
FIG. 6 shows a block diagram of an embodiment of the method according to the invention in an intermediate frequency filter and FIG. 7 shows a block diagram of an embodiment of the method according to the invention in an intermediate frequency filter in which an indicator is also realized after the lower intermediate frequency filter.

The method according to the invention can also be advantageously applied by defining the signal level RSSI (Tch), RSSI(Nch) from the intermediate frequency filter 27 signal, as shown in the diagram in FIG. 6. The intermediate frequency signal $f_{IF}$ at the output of the intermediate frequency filter is input to the AD converter ADC for sampling and conversion into digital form. The converted signal RXDATA is input from AD converter 26 to digital signal processor unit 23, which uses the converted signal to create control voltage $U_{IF}$ for adjusting the intermediate frequency filter. The adjustment can also be advantageously implemented with a capacitive diode, for example. The capacitance of the capacitive diode changes as the control voltage changes, correspondingly changing the frequency response of the intermediate frequency filter.

Figure 7:
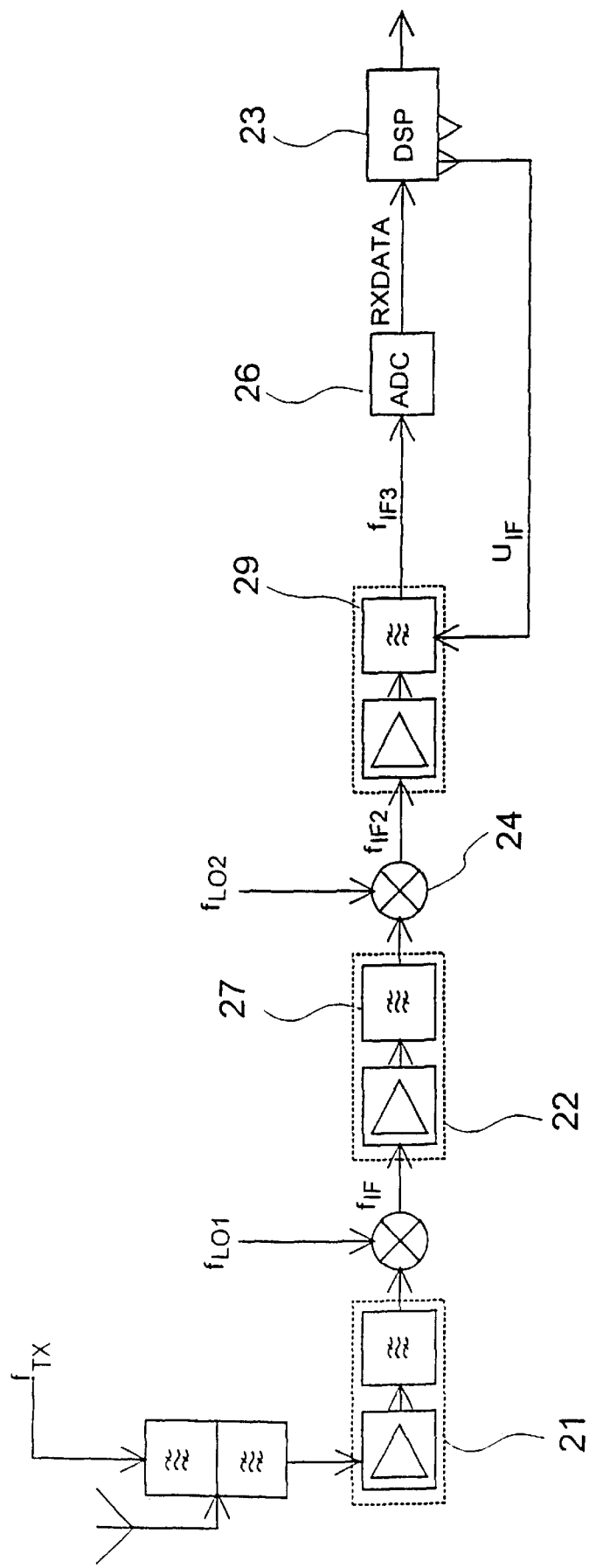

The block diagram in FIG. 7 shows another application of the method according to the invention, in which the signal level RSSI(Tch), RSSI(Nch) is determined from the second intermediate frequency filter 29 signal. This application differs from the one shown in FIG. 6 in that this application uses two intermediate frequencies ($f_{IF}$, $f_{IF2}$). The second filtered intermediate frequency signal $f_{IF3}$ is input from the output of the second intermediate frequency filter to AD converter ADC for sampling and conversion into digital form. The converted signal RXDATA is input from AD converter 26 to digital signal processor unit 23, which uses the converted signal to create control voltage $U_{IF}$ for adjusting the second intermediate frequency filter 29.

In radio devices that apply the method according to the invention, the measurement forming the basis for adjusting the frequency response of the filter belonging to the receiver is most suitably made between receiver time period RX and transmitter time period TX, possibly during measurement time period M1. In some applications the most advantageous moment for measurement is just before or immediately after receiver time period RX, when measuring the strength of the signal in the transfer channel adjacent to the receiver channel. This will minimize the time required for the frequency of the local oscillator $f_{LO1}$ to reach equilibrium, because the required frequency change is as small as possible.

The method according to the invention offers noticeable improvements compared to methods of the prior art. By changing the frequency response of the receiver filter according to the present invention, the reliability of measurements made by radio devices will also improve in radio telephone networks that have a relatively narrow frequency range reserved for use by transfer channels. Furthermore, the receiver of the radio device will also function better during normal reception in a network with disturbances, compared to the receivers of radio devices of the prior art. By using radio devices that apply the method described in the present invention, the information transferring capacity of radio telephone systems can be increased, because more channels can be made available to base stations located near to each other than is possible when radio devices of the prior art are used. This will improve the usability of the radio telephone system and lower the user-specific costs of the radio telephone system.

It is clear that the invention can also be applied by using a combination of several of the methods described above.

For example, the adjustment can be made in both intermediate frequency filter 27 and base frequency filter 25. The adjustment can also be realized by having the change in the frequency response of the adjustable filter affect both the bandwidth and the slope.

In theory, the invention could also be applied to adjust the bandwidth or slope of a high frequency filter based on measurement results. However, it is extremely difficult to realize a filter with a sufficiently narrow bandwidth and steep slope in a high frequency unit with prior technology.

With prior technology, the present invention is most advantageously applied in systems based on time-division multiple access, but it can also be used in systems based on frequency-divided multiple application, whereupon it is most advantageous to make the measurement from the strength of the transfer channel signal used to transfer information and make the necessary corrections experimentally.

In principle, the present invention can also be applied in code-division systems, but it would not be very easy to realize this with prior technology, because the transfer channel used to transfer information changes very quickly during the connection due to frequency hopping, whereupon the calculations needed for adjustments would require a very powerful digital signal processing unit and very short settling times for synthesizers and hardware in general.

The method according to the invention can also be applied in the receiver of a radio device in a base station, where the frequency response of the filter in the receiver can advantageously be adjusted by measuring the signal level of a transfer channel near the receiver channel and using the measurement result to create the control that adjusts the frequency response of the filter. The above steps can most suitably be performed with a digital signal processing unit or similar unit belonging to the receiver of the radio device in the base station.

We claim:

1. A method for filtering disturbances in the receiver of a radio device in a radiotelephone system, the system transferring information between the radio device and a base station via a receiving channel assigned by the base station, wherein signal levels in transfer channels assigned by the base station are determined in a receiver of the radio device with a measurement, the method comprising steps of:

providing a receiver of the radio device with an adjustable filter;

measuring a signal strength in a receiving channel of the receiver and a signal strength in at least one neighboring transfer channel having a passband near a passband of the receiving channel;

adjusting a passband characteristic of the adjustable filter in response to a comparison between a difference of the channel signal strengths and a threshold;

determining the bit error rate (BER) for at least some of respective passband characteristics of the adjustable filter obtained in the adjusting step; and selecting a passband characteristic for the adjustable filter based on measurement of relative signal strength under the condition wherein the difference between signal strengths is less than the threshold, and additionally based on values of the BER under the condition wherein the difference between signal strengths is greater than the threshold.

2. A method according to claim 1, wherein, in the measuring step, the one transfer channel is adjacent to the receiving channel.

3. The method according to claim 1, wherein, in the measuring step, there is a determining of the strength of a receive signal.

4. The method according to claim 1, wherein, in the measuring step there is a determining of the strength of a carrier.

5. A method according to claim 1, further comprising a forming of the control, the forming of the control comprising the steps of:

calculating the average value of the signal level of the receiving channel (RSSI (Tch));

calculating the average value of the signal level of a transfer channel in (RSSI (Nch)) near to the receiving channel;

obtaining the difference between the average value of a signal level of the channel near to the receiving channel (RSSI (Tch)) and the average value of the signal level of the receiving channel (RSSI (Tch));

determining if the difference is greater than a predefined first threshold value (A); setting the bandwidth of the adjustable filter to a first set value (W1); and if the difference between the average value of the signal level of the channel near to the receiving channel (RSSI (Nch)) and the average value of the signal level of the receiving channel (RSSI (Tch)) is less than or equal to the predefined first threshold value (A), setting the bandwidth of the adjustable filter to a second set value (W2).

6. A method according to claim 5, wherein said forming of the control additionally comprises the steps of:

if the bandwidth of the adjustable filter equals the first set value (W1), calculating a first average bit error ratio (BER1);

if the bandwidth of the adjustable filter equals the second set value (W2), calculating the second average bit error ratio (BER2) and if the second average bit error ratio (BER2) is less than the first bit error ratio (BER1), setting the bandwidth of the adjustable filter to the second set value (W2).

7. A method according to claim 1, wherein the filter is an analog filter, the method further comprising a step of adjusting the frequency response of the analog filter by changing a capacitance of the filter.

8. A method according to claim 1, wherein, in said adjusting step. the filter is adjusted in accordance with a characteristic of a base frequency filter or an intermediate frequency filter.

9. The method according to claim 1, wherein, in said step of using measurement results of signal levels of at least one transfer channel, the step is based on a characterization of the radiotelephone system as being based on a time division multiple access (ITDMA) system.

10. The method according to claim 9, wherein. in said measuring step, the measurement is made between receiving (RX) and transmitting (TX) time periods.

11. The method according to Claim 10, wherein, in said measuring stem, the measurement is made during a measurement time period (M1).

12. A circuit for filtering disturbances in the receiver of a radio device in a radio telephone system, wherein information is to be transferred between a radio device and a base station via a receiver channel assigned by the base station, and wherein signal levels in transfer channels assigned by the base station are to be determined in the receiver of the radio device, the circuit comprising:

an adjustable filter having an adjustable frequency response, the radio device including means for adjusting the frequency response of the adjustable filter; and means for forming a control of the adjustable filter;
wherein said control-forming means is operative in accordance with a procedure comprising steps of:
measuring a signal strength in a receiving channel of the receiver and a signal strength in at least one neighboring transfer channel having a passband near a passband of the receiving channel;
adjusting a passband characteristic of the adjustable filter in response to a comparison between a difference of the channel signal strengths and a threshold;
determining the bit error rate (BER) for at least some of respective passband characteristics of the adjustable filter obtained in the adjusting step; and
selecting a passband characteristic for the adjustable filter based on measurement of relative signal strength under the condition wherein the difference between signal strengths is less than the threshold, and additionally based on values of the BER under the condition wherein the difference between signal strengths is greater than the threshold establishing values of the control based on results of a measurement of the measuring step.

13. The circuit according to claim 12, wherein the means for forming the control comprise at least in part a digital signal processing unit.

14. The circuit according to claim 12, wherein the adjustable filter is at least in part realized in a digital signal processing unit included within the radio device.

* * * * *